July 13, 1926.
I. J. SVARSTAD
1,592,473
CANDY BOX SIMULATING RADIO
Filed May 15, 1925 2 Sheets-Sheet 1
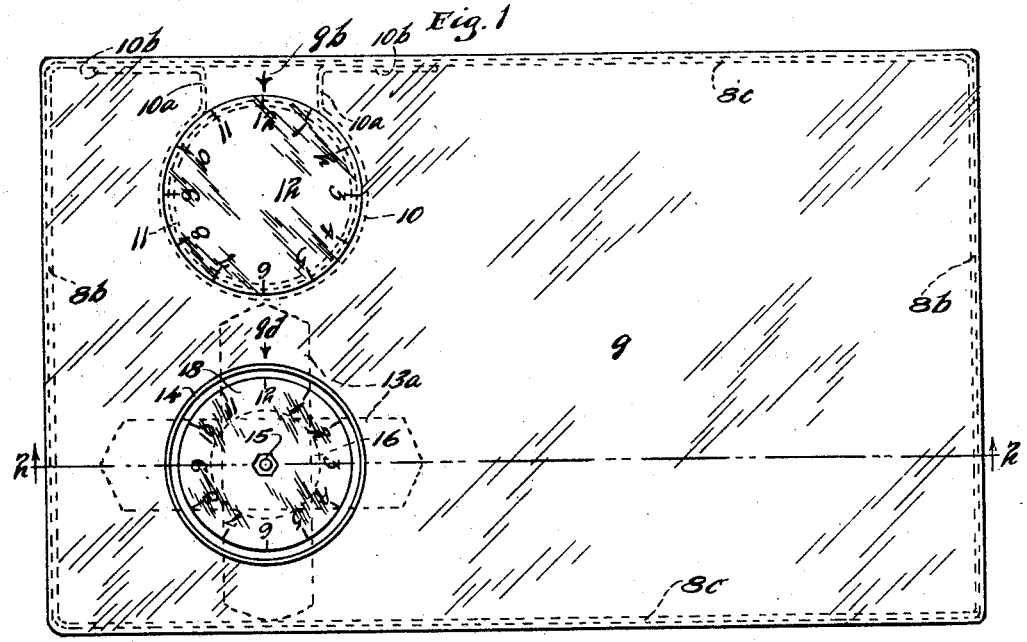
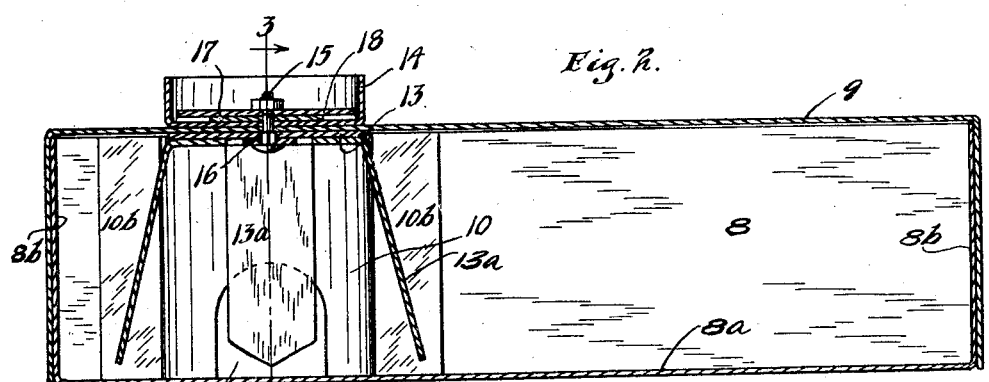
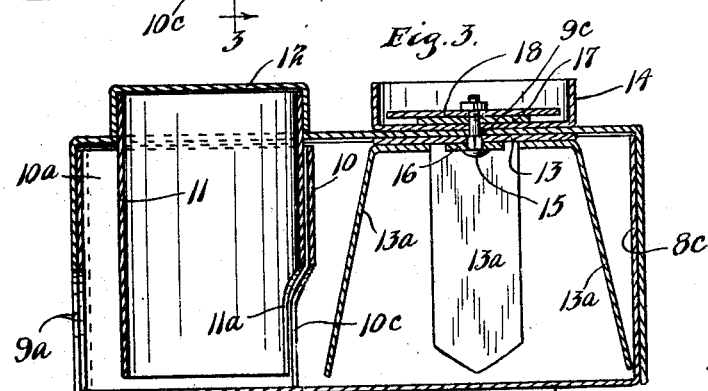
INVENTOR.
IVER J. SVARSTAD.
BY HIS ATTORNEYS.

July 13, 1926.
I. J. SVARSTAD
1,592,473
CANDY BOX SIMULATING RADIO
Filed May 15, 1925  2 Sheets-Sheet 2
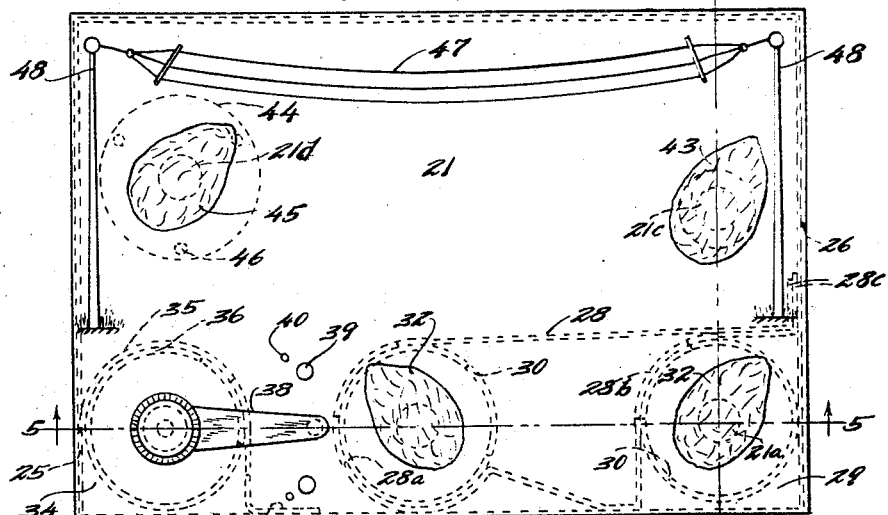
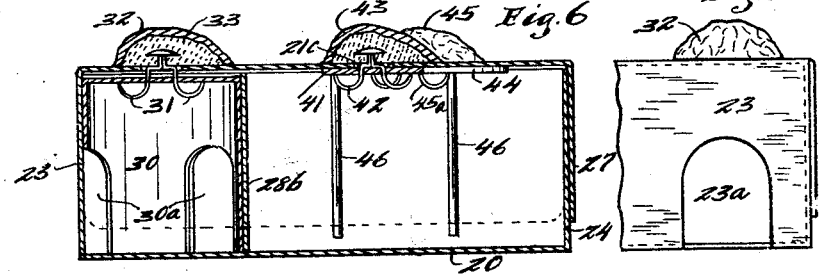
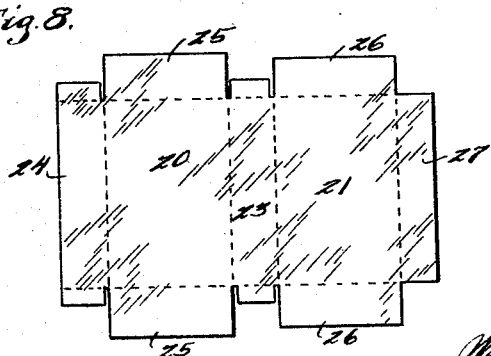
INVENTOR.
IVER J. SVARSTAD.
BY HIS ATTORNEYS.

Patented July 13, 1926.

1,592,473

UNITED STATES PATENT OFFICE.

IVER J. SVARSTAD, OF ABERDEEN, SOUTH DAKOTA.

CANDY BOX SIMULATING RADIO.

Application filed May 15, 1925. Serial No. 30,537.

This invention relates to a box or container for candy, nuts, or similar articles, and preferably, to such a box or container comprising means for dispensing the articles therein without opening the box, the box preferably being arranged to simulate a radio receiving set. Candy boxes or containers comprising novel discharging means are in demand among candy manufacturers and the box or container of this invention is designed to give an entertainment to children and other people and also to function efficiently in the dispensing or discharging of the candy.

It is an object of this invention to provide a candy container preferably in the form of a box having a lid, which lid carries rotating members or dials adapted to operate members in the box functioning to discharge the candy.

It is a further object of the invention to provide a candy box or container having a casing therefor with an opening communicating with the interior of the box and a rotatable member disposed in said casing having an opening adapted to aline with the first mentioned opening and also to aline with an opening in the wall of the box, said rotatable member being rotated by a dial or other means carried on the lid.

It is a further object of the invention to provide a box or container, as set forth in the preceding paragraph comprising a plurality of casings having rotatable means therein adapted to permit the entry and exit of candy to and from said casings and also comprising a stirrer or agitator also operated by a dial or member disposed on the lid.

These and other objects and advantages of the invention will be fully set forth in the following description made in connection with the accompanying drawings in which like reference characters refer to the same parts throughout the different views, and in which Fig. 1 is a plan view of one form of the device;

Fig. 2 is a vertical section on the line 2—2 of Fig. 1, as indicated by the arrows;

Fig. 3 is a vertical section on the line 3—3 of Fig. 2, as indicated by the arrows;

Fig. 4 is a plan view of a modified form of the invention;

Fig. 5 is a vertical section taken on the line 5—5 of Fig. 4, as indicated by the arrows;

Fig. 6 is a vertical section taken on the line 6—6 of Fig. 4, as indicated by the arrows;

Fig. 7 is a partial view in side elevation of the box, as shown in Figs. 4 to 6; and Fig. 8 is a plan view of the blank used for the box, shown in Figs. 4 to 6.

Referring to the drawings, particularly Figs. 1 to 3, a rectangular box 8 is shown having a bottom 8$^a$, end walls 8$^b$, and side walls 8$^c$. A lid 9 is adapted to fit closely over the box 8 and is of the depth substantially equal to the height of the box 8. The box 8 has disposed therein a casing 10 which is cylindrical in shape in the greatest portion of its extent but has its sides extending parallel toward one side 8$^c$ of box 8, as shown at 10$^a$, thus forming an opening in the side of the casing, the sides 10$^a$ being bent substantially at right angles and glued or otherwise fastened to the side 8$^c$ of the box, as indicated at 10$^b$. The box 8 and the lid 9 each have an opening 9$^a$ in their side walls adjacent the bottom of the box, which openings 9 are normally alined and are also alined with the opening in the side of casing 10. The casing 10 also has an opening 10$^c$ in its side opposite the opening between its side portion 10$^a$, which opening 10$^c$ is preferably of the same shape as the openings 9$^a$ and is alined with said openings 9$^a$. The casing 10 is, of course, held in stationary position and the same has rotatably mounted therein a cylindrical shell 11 extending in close proximity to the bottom 8$^a$ of the box and having an opening 11$^a$ at its lower portion adapted to aline with the openings 9$^a$ and 10$^c$ and preferably of substantially the same shape and size as said openings 9$^a$ and 10$^c$. The shell 11 extends through a circular opening in the lid 9 which it substantially fits and the same has secured to its top by gluing or by any other suitable manner, a cap 12 disposed above and resting on the lid 9. The lid 9 may be provided with a point 9$^b$ and the top of cap 12 may be graduated with radial graduations, as shown, which may be numbered in any manner as by the numbers 1 to 12 shown in Fig. 1. The lid 9 is also arranged to carry a member 13 on its underside having secured thereto and depending downwardly therefrom in slightly diverging relation, a plurality of arms 13ª illustrated as four in number and shown as of considerable width, which width is slightly less than the width of the opening 11ª. The member 13 is adapted to be rotated by a cup member 14 disposed on top of lid 9 and connected to member 13 by a headed and nutted bolt 15 passing through member 13, a small washer 16 disposed against this head and beneath member 13, through the lid 9 and the cup 13 and also through a large washer 17 and a dial 18 disposed thereon. The bolt 15 is made square in cross section below the dial 18 and passes through an opening 9ᶜ in the top of lid 9. The washer 17 is glued to the cup 14 and to the dial 18 and the washer 16 is glued to the members 13. With this construction the turning movement of cup 14 turns the members 13 and arms 13ª, and also turns a dial 18. The lid 9 may also be provided with a pointer or pointed mark 9ᵈ thereon and the dial 18 may be marked with radial graduations which preferably will be numbered as by the numbers 1 to 12 illustrated in Fig. 1.

In the operation of the device shown in Figs. 1 to 3, the box will be filled with pieces of candy of such a size that they will readily pass through the openings 9ª, 10ᶜ and 11ª as well as through the passage between sides 10ª of the casing 10. The openings 9ª through the side of the box will normally be closed by the rotatable member 11.

In order to extract a piece of candy from the box the operator will have to turn the cap 12 so as to aline the openings 11ª and 10ᶜ. He will not be able to see when these openings are alined and will, therefore have to manipulate the device until he gets said openings into alinement. A piece of candy can then pass into the rotatable member 11. Said members can then be turned so as to bring the opening 11ª into alinement with the openings 9ª and a piece of candy can be discharged through said latter opening. It will be seen that if one of the members 13ª is in front of the opening 10ᶜ that a piece of candy cannot enter member 11 even though opening 11ª is alined with opening 10ᶜ. The cup 14 and dial 18 must then be turned so as not to obstruct opening 10ᶜ. The rotation of member 13 may also push some of the candy pieces away. It will take some manipulation therefore for the operator to secure a piece of candy. The members 12, 14 and 18 are arranged to simulate radio controlling dials of a radio receiving set and a child can thus play that he is tuning in for a certain station. When he receives the piece of candy he will have tuned in on some station and the piece of candy will be wrapped and marked with the name of some sending station. The child is thus rewarded for his operation of the device.

In the embodiment of the invention shown in Figs. 4, 5 and 6, a box is shown made from a blank such as shown in Fig. 8. The blank has a bottom portion 20 of rectangular shape and a top 21 of rectangular shape, these parts being separated by a strip 23 forming one long side of the box. The bottom 20 has a flap 24 along its side and flaps 25 at each end and the top 21 has flaps 26 at each end and a flap 27 along its long side. In forming the box the flaps 24 and 25 are folded upwardly substantially at right angles to the bottom 20. The strip 23 is folded up along the bottom 20 substantially at a right angle, and the top 21 is folded substantially at the right angle to the strip 23. Flaps 26 and 27 of the top are also folded upwardly substantially at a right angle. The lid 21 is then swung over the bottom portion 20, the flaps 29 and 27 being disposed outside of the flaps 25 and 24, respectively. The box will then appear as shown in Figs. 4 to 6. A casing 28 formed of a strip of cardboard or similar material of substantially the height of the box, is secured to the bottom 20. This casing has a semi-cylindrical portion 28ª at one end and another partly cylindrical portion 28ᵇ at its other end adjacent the end of the box. It will be noted the ends of the strip forming the casing 28 are bent substantially at a right angle and secured together by gluing or otherwise, and also similarly secured to the end of the box, these ends being shown as 28ᶜ. These ends will, of course, be secured to one of the strips 25. The casing 28 has formed in its cylindrical portion 28ª an opening 28ᵈ. This opening is of a shape shown in Fig. 5 and forms a communication between the interior of the box and casing 28. The casing 28 has formed in its cylindrical portion 28ª an opening 28ᵈ. This opening is of a shape shown in Fig. 5 and forms a communication between the interior of the box and casing 28. The casing 28 and its portion 28ᵇ also has an opening 28ᵉ similar to the opening 28ᵈ and this opening forms a communication between the interior of casing 28 and the interior of a chamber 29 in the corner of the box, the chamber 29 being formed by a portion of the side and end of the box and the semi-cylindrical portion 28ᵇ. A cylindrical shell 30 is disposed in each of the portions 28ª and 28ᵇ, which shells rest on the bottom 20 and are rotatable. The shells 30 have fasteners shown as headed split rivets or fasteners 31 extending through their closed tops, which fasteners extend through openings 21ª in the lid or top 21 and are provided with suitable operating members 32. While the operating members may be made of various shapes or forms, in the embodiment of the invention illustrated the same are shown as halves of the shells of English walnuts, the shell being filled with some hardening substance 33 such as plaster of Paris in which is embedded the head of the members 31. The shells 30 can thus be rotated by rotation of members 32, which latter members are disposed on top of the lid or top 21. The members 30 each have one or more openings 30ª formed therein adjacent their bottoms. The opening 30ª in one of the members is adapted to aline with the opening 28ᵈ of the member 28 and the opening 30ª in the member 30 at the corner of the box is adapted to aline with the opening 28ᶜ and also adapted to aline with a similar opening 23ª formed in the side 23 of the box, the opening 23ª being of the same shape and size as the opening 28ª and 30ª.

A chamber 34 is formed in the corner of the box at the other end of the side 22 from the chamber 29 and this chamber 34 is formed by a strip 35 of cardboard or similar material, having one end 35ª secured by gluing or otherwise, to the side 22, which strip is of semi-cylindrical form and has its other end secured by gluing or otherwise to the end 25 of the box. The member 35 has an opening 35ª formed therein adjacent its bottom and a rotatable shell 36 fits in the member 35ª and is rotatable therein, said shell having an opening 36ª in its bottom, which opening is similar in shape to the openings 28ᵈ and 28ᶜ. The shell 36 has a closed top and a headed fastener 37 has arms 37ª extending through the top and turned outwardly below the same, said arms 37ª extending through an opening 21ᵇ in the top 21 and through the end portion of an arm 38 which is disposed above the top 21. The arm 38 can thus be swung and will move the member 37 and the shell 36 and the end of arm 38 is adapted to rest over the small rivets 39 secured in the top 21, the arms being stopped in position over the rivets 39 by the stop pins 40 also secured in the top 31. When the arm 38 is swung over the rivets 39 the opening 36ª will be partly out of alinement with the opening 35. A disk 41 is disposed below the top 2 and has a headed fastener 42 with spread arms extending therethrough and through an opening 21ᶜ in the top 21, which fastener is embedded in material inside of the nut shell 43, the disk 41 thus being rotatable with the shell 43. Another disk 44 is secured beneath the top 21 by a headed split fastener 45ª, the arms of which fastener 45 extend through the disk 44 and the head of such fastener being embedded in the shell 45 disposed above the top 21, the fastener passing through an opening 21ᵈ in the top 21. The disk 44 has secured thereto and depending therefrom, pins 46 which depend nearly to the bottom of the box.

The top of the box will be suitably ornamented and arranged to simulate a radio cabinet and may have a representation of an aerial 47 with the supporting posts 48, as shown in Fig. 4.

With the construction shown in Figs. 4, 5 and 6, pieces of candy or similar article will be placed in the box and the box closed, as shown in Figs. 4, 5 and 6. The fasteners holding the shells 30 and 36 and the disks 41 and 44 in position can be placed in position before the box is completely closed and when the box is folded and closed, as shown, the flaps 24 and 25 will be sealed in any suitable manner.

The pieces of candy or articles in the box will be of such size that they will readily pass through the various openings 28ᵈ, 28ᶜ, 30ª, 35ª, 36ª and 23ª. By turning the member 32 at the inner end of the chamber 28 the opening 30ª can be brought into alinement with the opening 28ᵈ so that a piece of candy can pass into the chamber 28. By turning the operating member 32 at the corner of the box the opening 30ª and chamber 29 can be brought into alinement with opening 28ᶜ and said piece of candy can then pass into the chamber 29ª. The opening 30ª can then be brought into alinement with the opening 23ª in the side of the box and a piece of candy discharged or extracted. Several pieces of candy can be placed in the chamber 34 and these can be allowed to pass out of said chamber by bringing the opening 36ª and shell 36 into alinement with opening 35ª and the piece of candy in the chamber 34 can then be allowed to pass into the interior of the box. The operating member 45 can be turned to agitate or throw the piece of candy in the box into different positions. The member 43 is provided simply as a blind and this member has no effect on the candy in the box. It will thus be seen that variously manipulating the operating members 32, 38 and 45, that pieces of candy may be worked toward and discharged through the opening 23ª in the side of the box. The candy will be wrapped and marked with the name of various radio sending stations and when a piece of candy is extracted, it will represent a sending station which has been tuned in by the receiving apparatus which the box of candy is designed to simulate.

From the above description it is seen that applicant has provided a simple, efficient and ingenious candy container and one which can be operated with great entertainment and interest by children and others The same forms a desirable novelty in the art and one that will be found to have a high degree of utility. The device has been demonstrated in actual practice and found to be quite successful and efficient.

It will, of course, be understood, that various changes may be made in the form, details, arrangement and proportions of the parts without departing from the scope of applicant's invention, which, generally stated, consists in a device capable of carrying out the objects above set forth, such as shown and described and defined in the appended claims.

What is claimed is:

1. A container for candy, nuts or similar articles comprising a body, a lid therefor, a casing disposed in said body having a wall with an opening therethrough communicating with the interior of said body, said body having an opening through the wall thereof, a rotatable member in said casing adapted to close said openings but having an opening therethrough arranged to be brought into alinement with either of said openings, and means above said lid for rotating said rotatable member, whereby a piece of candy may pass into said casing and then may pass from said casing out through the wall of said body.

2. The structure set forth in claim 1, a rotatable member in said body having spaced depending arms, and means on top of said lid for rotating said last mentioned member.

3. A container for candy, nuts, or similar articles having a body and a lid, a casing disposed in said body having a wall with an opening therethrough communicating with the interior of said body, a rotatable member disposed in said casing having an opening adapted to aline with said opening in the wall of the casing, a chamber within said casing having a wall with an opening therethrough which latter opening affords communication between said chamber and the interior of said casing, a rotatable member disposed in said chamber and having an opening in its wall adapted to aline with the said opening in the wall of said chamber and said body having an opening through the side thereof with which the opening in said last mentioned rotatable member is adapted to aline, and means on top of said lid connected to said rotatable members for rotating the same.

4. The structure set forth in claim 3, a second casing in said box spaced from said first mentioned casing and having an opening through the wall thereof communicating with the interior of said body, a rotatable member in said last mentioned casing having an opening through the wall thereof adapted to be brought into and out of alinement with the opening in said last mentioned casings, and means above said lid connected to said last mentioned rotatable member for turning the same.

In testimony whereof I affix my signature.

IVER J. SVARSTAD.